Feb. 2, 1965    A. KIMBALL    3,167,919
SAFETY DEVICE FOR HYDRAULIC BRAKES
Filed May 2, 1963    2 Sheets-Sheet 1
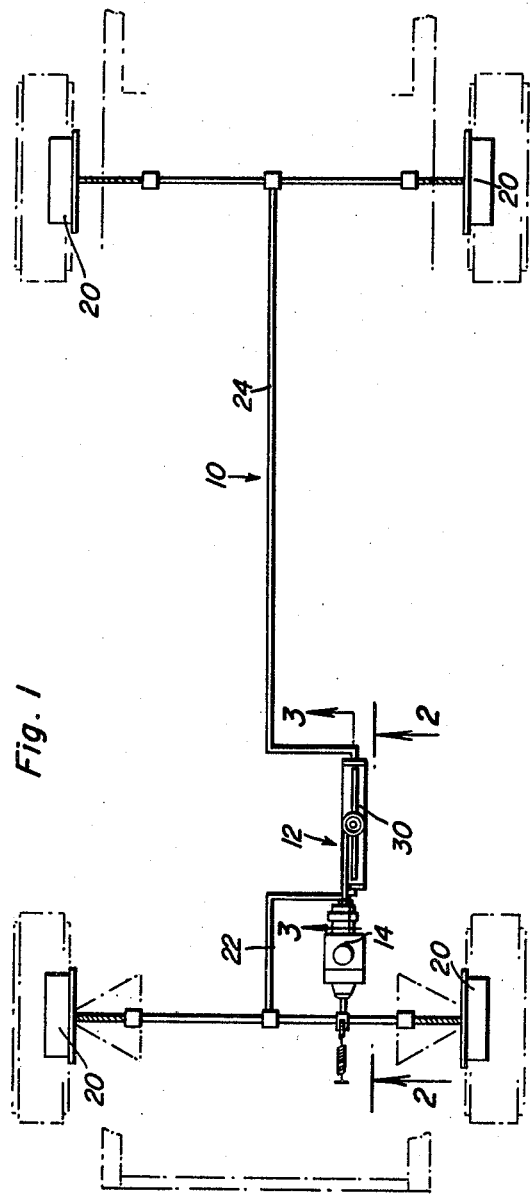
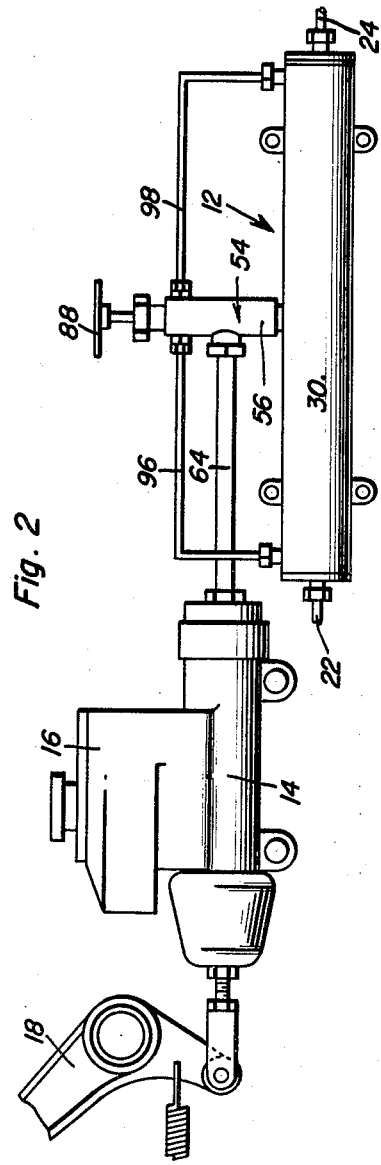
Alton Kimball
*INVENTOR.*

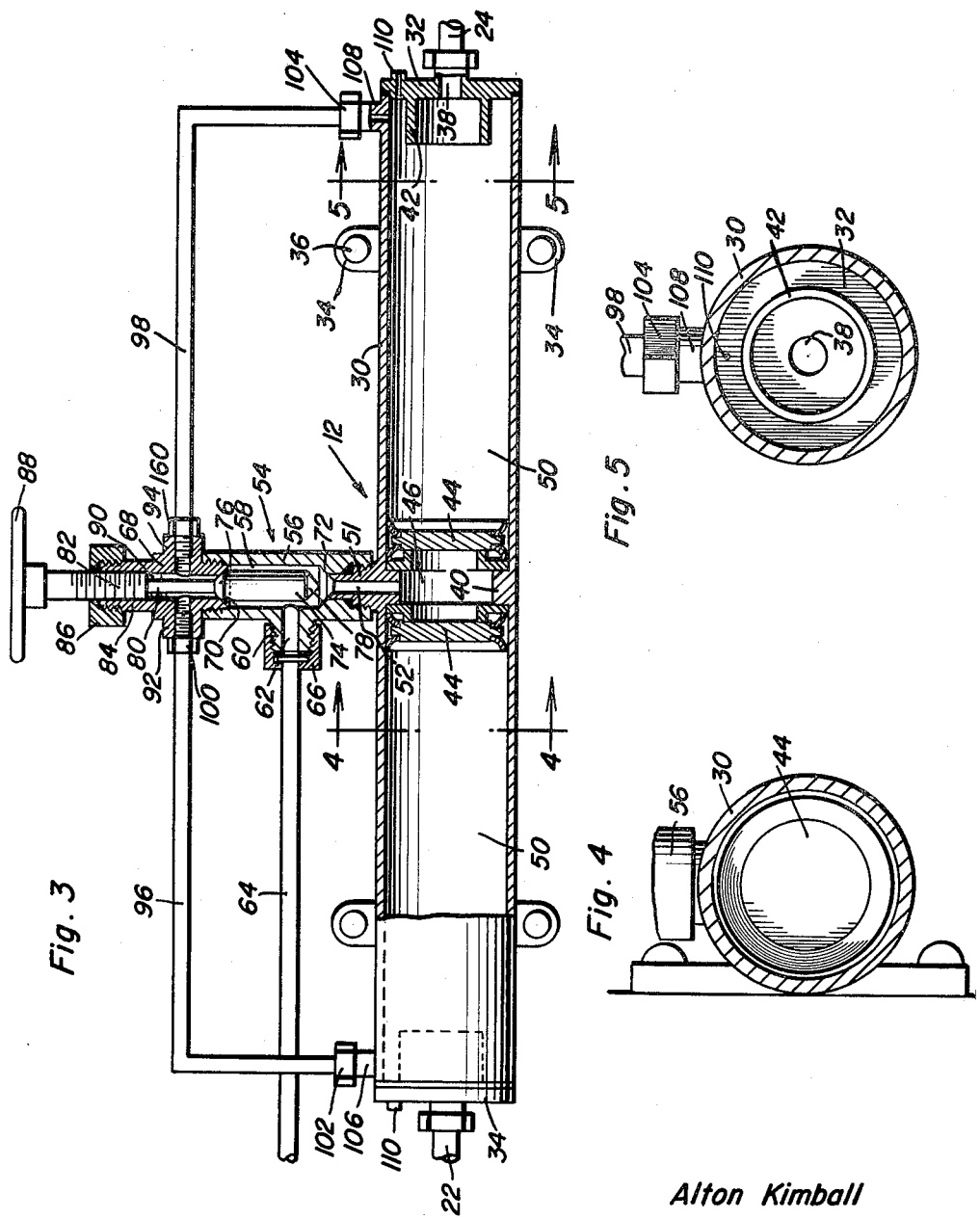

United States Patent Office 3,167,919
Patented Feb. 2, 1965

3,167,919
SAFETY DEVICE FOR HYDRAULIC BRAKES
Alton Kimball, Rte. 20 at Canal St., Bouckville, N.Y.
Filed May 2, 1963, Ser. No. 277,644
8 Claims. (Cl. 60—54.5)

This invention comprises a novel and useful safety device for hydraulic brakes and more particularly pertains to a mechanism adapted to be interposed between the master cylinder and the wheel brake cylinders of an automotive vehicle hydraulic brake system for preventing the complete loss of fluid in all of the brake actuating conduits and thus the complete failure of the hydraulic brake system of the vehicle in the event of rupture of or loss of fluid from the brake fluid conduit connected to one of the wheel brake cylinders.

It is the primary object of this invention to provide a safety device which may be readily interposed between the master cylinder and the wheel brake cylinders of a vehicle hydraulic brake system in either a new construction as a component thereof or as an attachment to existing hydraulic brake systems and which will prevent failure of the hydraulic brakes on all of the vehicle wheels in the event of loss of fluid in the brake fluid conduit to one of the wheel cylinders.

It is a further object of the invention to provide a device in accordance with the foregoing object which is specifically applicable to hydraulic brake systems of the type having a first conduit from the master cylinder supplying fluid to the two brake cylinders at the front of a vehicle and a second conduit supplying brake fluid to the two rear wheel cylinders.

A still further object of the invention is to provide a device in accordance with the foregoing objects which shall include means, manually operable after the cause of failure in a brake conduit has been corrected, to apply brake fluid under pressure behind the actuator pistons of the safety device for returning them to their original operative position.

Yet another purpose of the invention is to provide a device in accordance with the foregoing objects wherein these is provided a selector valve which is continuously connected to the master cylinder for receiving brake fluid under pressure therefrom and which is alternately and selectively operable to place the brake cylinder fluid into direct communication with the operating chamber between a pair of actuator pistons in the safety device during normal operation of the brakes, and to the actuator chambers on the outer sides of the actuator pistons for returning the latter to their original position in readiness for operation.

Still another and more specifice object of the invention is to provide a device in accordance with the foregoing objects which shall include therein stop means disposed at the center of an actuator cylinder for limiting the inward travel of the actuator pistons into the actuator chamber when the brakes are not applied and further stop means carried by closure plugs at the outer ends of the actuator cylinder for both limiting the outward travel of the actuator pistons therein and thus providing a stop means in the event of failure in one of the brake conduits and which will also in the event of such a failure, cause the actuator piston associated therewith to cut off the flow of fluid into the defective conduit.

Still another purpose of the invention is to provide a device in accordance with the foregoing objects which shall include a vent means connected with each of the actuating chambers of the safety device for venting the latter when it is necessary to recharge the cylinder with brake fluid after repairing a failure in the hydraulic brake system.

And a final important object of the invention to be specifically enumerated herein resides in the provision of a safety device in accordance with the foregoing objects which shall be of an extremely simple and compact construction, and yet easily applied to and associated with the master cylinder and the conduit system delivering fluid from the master cylinder to the wheel cylinders of a vehicle hydraulic brake system.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a somewhat diagrammatic view showing in plan a conventional type of an automotive vehicle hydraulic brake system together with the manner in which the safety device of this invention is applied thereto, certain parts of the vehicle itself being indicated in dotted lines therein for the purpose of orientation;

FIGURE 2 is a view in side elevation taken substantially upon the plane indicated by the section line 2—2 of FIGURE 1 and showing the manner in which the safety device of this invention is associated with the master cylinder of a hydraulic brake system;

FIGURE 3 is a further detail view taken upon an enlarged scale substantially upon the plane indicated by the section line 3—3 of FIGURE 1 and showing the internal construction of the safety device, parts being shown in elevation, concealed parts being indicated in dotted lines therein; and, FIGURES 4 and 5 are detail views taken in vertical transverse sections substantially upon the planes indicated by the section lines 4—4 and 5—5 respectively of FIGURE 3 and showing respectively details of the actuator members or pistons of the device and of the closure plug with its outer stop and port sealing means carried thereby.

Referring first to FIGURE 1 there is diagrammatically represented a motor vehicle having a hydraulic brake system indicated generally by the reference numeral 10 and which incorporates therein the safety device of this invention indicated generally by the numeral 12. While the invention is applicable to many different types of hydraulic brake systems, for convenience of illustration there is shown a brake system in which a conventional master cylinder 14 having a brake fluid reservoir 16 associated therewith is operated as by a brake pedal 18 in the usual manner. The master cylinder is connected by a conduit system to brake cylinders, not shown, on the individual brake drum assemblies 20 of each of the four wheels of the vehicle. In the system illustrated, a first brake actuating conduit as at 22 is connected to the front wheel brake cylinders while a second conduit 24 is similarly connected to the rear wheel brake cylinders.

In conventional hydraulic brake systems, leakage of fluid at any one of the wheel brake cylinders or in the associated conduit will drain the brake fluid from the entire system and render all of the brakes inoperative. This obviously creates a very dangerous driving hazard for the operator of the vehicle.

It is therefore the primary object of this invention to provide a safety device which may be readily incorporated into the brake actuating conduit system either as an attachment thereto or as an integral initial component thereof in order to prevent failure in one of the brake actuating conduits from rendering the entire system inoperative. In the particular system and arrangement shown, as set forth hereinafter, it will be apparent that the failure of one of the conduits connected to the first conduit 22 will in no way interfere with proper operation of the wheel brake cylinders connected to the second conduit 24, and vice versa. Thus, even though a leak should develop in one of the conduits of the system, the entire system is not rendered inoperative and braking action is available.

In applying this invention to a hydraulic brake system, it is merely necessary to disconnect the previous connection of the two conduits 22 and 24 to the master cylinder, connect these conduits to the safety device 12 and connect the latter to the master cylinder so that actuation of the master cylinder will effect through the device 12 action of the two conduits 22 and 24 and their associated wheel brakes without danger of failure in one of the conduits and its associated brake cylinders impairing operation of the remainder of the brake cylinders.

It will be appreciated that the safety device 12 may be installed and mounted in any convenient location upon a motor vehicle or upon components of the hydraulic brake system 10. Inasmuch as it is connected to the master cylinder as well as to the wheel cylinders only by a flexible conduit system, its precise location can be selected in accordance with the dictates of convenience, and is not limited by any necessity for its being immediately adjacent to the master brake cylinder.

Referring now specifically to FIGURE 3 it will be observed that the safety device 10 includes an actuator cylinder 30 which may conveniently comprise an open-ended tube or housing having removable end closures 32 secured to the opposite ends thereof. Lugs or mounting brackets 34 which if desired may be integrally formed with the cylinder 30 or may consist of bands or straps surrounding the latter are secured as by fastening bolts 36 to any suitable support, not shown, upon the vehicle or some portion of the hydraulic brake system 10.

The end closures 32 are provided with outlet ports 38 to which are connected and with which communicate the previously mentioned conduits 22 and 24 connected to the front and rear wheel brake cylinders respectively. At substantially its mid-portion, the actuator cylinder 30 is provided with an inwardly projecting rib or ring 40 which may be integral or may be separately formed and rigidly secured thereto and which serves as a stop for a purpose to be later set forth. Projecting inwardly from each of the end closures 32 at the opposite ends of the cylinder 30 are cylindrical sleeves 42 which surround the ports 38 and comprise stops at the outer ends of the cylinder for a purpose to be subsequently apparent.

Movably received and reciprocable within the actuator cylinder 30 between the inner stop 40 and the outer stops 42 is a pair of actuator members in the form of free pistons each indicated by the numeral 44. The pistons may be of any suitable construction and have a sliding fluid-tight seal with the wall of the cylinder 30 and are reciprocable between the limits defined by the inner and outer stops 40 and 42 respectively.

It will thus be seen by reference to FIGURE 3 that the two actuator means or pistons 44 divide the interior of the cylinder into separate and distinct chambers including the central operating chamber 46 which is disposed between the two pistons 44 and a pair of outer or wheel brake actuator chambers each indicated by the numeral 50 and which are disposed between the pistons and the corresponding closure means 32.

In a manner to be subsequently set forth, the brake actuating impulses resulting from the piston or other brake actuating member movable within the master cylinder are applied to the operating chamber 46 and serve to force the actuator members 44 outwardly therefrom and into the corresponding actuator chambers 50. This outward movement of the pistons 44 in turn applies a brake actuating impulse to fluid within the chambers 50, through the outlet ports 38 and the associated conduits 22 and 24 to the respective wheel brake cylinders thus energizing the brakes. When the brake actuating pressure of the master cylinder is released, the springs associated with the wheel brake cylinders serve to cause the pistons therein to return the fluid to the actuator chambers and thus return the actuator members 44 to their initial or rest position as shown in FIGURE 3.

Observing again FIGURE 3 it will be seen that there is provided an externally threaded laterally projecting nipple or boss 51 having a fluid inlet passage 52 therethrough into the operating chamber 46 and through the inner stop ring 40. A selector valve assembly indicated generally by the numeral 54 is attached to this nipple and serves to control the flow of fluid therethrough in a manner to be now set forth. The selector valve assembly includes a valve body or housing 56 having a valve chamber 58 therein. The valve chamber has a laterally projecting externally threaded nipple or boss 60 with whose passage or port 62 a conduit 64 is placed in communciation as by means of a coupling nut 66. The conduit 64 in turn is connected to the master cylinder 14 and to the discharge or outlet opening thereof. When this device is applied to an existing hydraulic brake actuating system, the previous fitting by which the conduits 22 and 24 were connected to the outlet of the master cylinder is utilized for coupling of the master cylinder delivery conduit 64 thereto in place of the original connection by which brake actuating fluid was discharged from the master cylinder to the first and second conduits 22 and 24. The passage 62 opens into the valve chamber 58 intermediate the ends of the latter so that whenever the master cylinder is actuated, a pressure impulse will be produced in the valve chamber 58 and thus in the operating chamber 46.

The open upper end of the housing 56 is internally threaded to receive a fitting 68. Formed in the opposite ends of the valve chamber are valve seats 70 in the fitting 68 and 72 at the inlet of the passage 52. A double acting plunger valve 74 of considerably less diameter than the internal diameter of the chamber 58 is movable in this chamber being provided with a pair of seating surfaces as at 76 and 78 which respectively cooperate with the valve seats 70 and 72.

Integrally or rigidly but detachably secured to the valve body 74 is a valve stem 80 having an externally threaded portion 82 by which it is threadedly engaged in the upstanding internally threaded boss 84 at the upper end of the fitting 68. A packing gland 86 is provided to prevent leakage at this point and a manually operating handle 88 also enables ready adjustment of the valve. The arrangement is such that the valve may be selectively positioned to cause its seating surfaces to engage either of the valve seats 70 or 72 for a purpose to be subsequently apparent.

Communicating with the bore 90 within the valve fitting and which bore surrounds and is of considerably greater diameter than that of the valve stem 80 are a pair of internally threaded oppositely and laterally projecting bosses 92 and 94. Conduits as at 96 and 98 are connected to and communicate with these bosses, being secured thereto by the usual coupling nuts 100, which conduits have their other ends secured as by coupling nuts 102 and 104 to the externally threaded bosses 106 and 108 at the opposite ends of the cylinder 30. The conduits 96, 98 and the bosses 108 constitute a means forming a fluid supply means by which fluid is introduced into the actuator chambers 50 at the outer sides of the pistons 44.

As previously mentioned, the inwardly projecting sleeves 42 on the closure members 32 constitute outer stop means which are engageable by the pistons 44 when the latter move to their outermost position, as when there is a leak in the associated conduit means 22 to 24. Ordinarily, these pistons will reciprocate within their actuator chambers without contacting the sleeves or stop members 42. However, when a rupture occurs in the associated conduit 22 or 24, the corresponding piston will move all the way outwardly in its chamber until it engages upon the sleeve 42. This will prevent further outward movement of the piston and will also enable the piston to constitute a valve or closure member for the inner open end of the sleeve thereby preventing escape of further fluid therefrom.

However, when such a condition occurs and either one or both of the pistons is lodged against the stop members 42 and thus seals off and prevents escape of brake fluid through either or both of the associated conduit systems, the loss of braking power will warn the operator of the vehicle as to this condition. When the condition has been corrected, it is the necessary to refill the cylinder 30 and the actuator chambers 50 thereof with fresh brake fluid, vent any air accumulating therein, and return the pistons 44 to their initial position in readiness for operation. The present invention provides means for effecting these operations as follows.

In normal operation, the selector valve is in the position shown in FIGURE 3 with the valve seat 76 being closed by the valve surface 70 so that fluid from the conduit 64 cannot enter the conduits 96 and 98 which constitute a fluid return means. At this time, fluid from the master cylinder through the conduit 64 is placed in continuous communication by virtue of the uncovering of the valve seat 72 by the valve surface 74 so that the master cylinder is thus continuously connected to the operating chamber 46. However, when it is necessary to recharge the system with fluid and in turn force the pistons 44 from their position against an outer stop inwardly to their initial position, the valve is manually operated to close the valve 72 and the port 52. At this time, the valve uncovers the valve seat 70 and the fluid from the master brake cylinder through the conduit 64 is free to enter the valve chamber 58, pass upwardly through the bore 90 and enter the fluid return conduits 96 and 98 and thus enter the actuator chambers 50 under the pressure of the master cylinder. This pressure will then force and return the pistons to their inward position while simultaneously recharging the actuator cylinders with fluid. If desired, venting nipples or plugs 110 comprising bleed means of any desired construction may be provided in the closure means 32 in order to permit escape of or bleeding of air from the actuator cylinders during the recharging of the latter by the fluid return means.

It will be appreciated that in some instances the return means may be utilized for supplying brake fluid from any desired source other than the master cylinder in order to replenish the fluid in the actuator chambers 50. However, a preferred and very important feature of the invention resides in the use of the selector valve to selectively and alternately place the fluid in the master cylinder in communication either with the operating chamber 46 during normal operation of the brake system or in communication with the fluid return means 96, 98, when it is desired to replenish exhausted fluid in the actuator chambers and restore the actuator members 44 to their initial operating position.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A vehicle hydraulic brake system including a master brake cylinder, a plurality of wheel brake cylinders, a conduit means connecting said master cylinder to said wheel brake cylinders together with a safety device interposed in said conduit means, said safety device comprising an actuator cylinder with a pair of rigid actuator pistons freely slidable therein and defining between their proximate faces an operating chamber and defining actuating chambers between their remote ends and the adjacent ends of said actuator cylinder, said safety device further comprising a selector valve assembly having a body and including a valve casing with a valve chamber therein, a pair of valve seats disposed in said valve chamber, a selector valve reciprocably mounted in said valve chamber and engageable alternately with said valve seats and controlling flow therethrough from said valve chamber, said conduit means including a supply conduit establishing continuous communication between said master cylinder and said valve chamber and a passage establishing communication through one of said valve seats between said valve chamber and said operating chamber, brake actuating conduits connecting each actuating chamber with a wheel brake cylinder, said conduit means further including a fluid supply means establishing communication through the other valve seat with each of said actuating chambers for replenishing the latter with brake operating fluid and returning said actuator pistons into said operating chamber, a pair of stop means each disposed in the other end of an actuating chamber, each stop means consisting of a sleeve surrounding the entrance of a brake actuating conduit into an actuating chamber, each actuator piston being engageable at the outer end of its stroke with said sleeve and shutting off flow of brake fluid from said actuating chamber to said brake actuating conduit, said fluid supply means having a pair of ports each communicating with an actuating chamber between said stop and the adjacent surrounding wall of said actuating chamber.

2. The combination of claim 1 wherein said valve seats are aligned and in opposite ends of said valve chamber, said selector valve being double-ended and having each end complementary to and cooperating with one of said valve seats.

3. The combination of claim 2 wherein said supply conduit communicates with said valve chamber intermediate said valve seats, said selector valve being of less diameter than that of said valve chamber and providing an annular passage about said valve for free flow of fluid therepast in either direction.

4. The combination of claim 1 including a tubular boss projecting laterally from said actuator cylinder and having a bore continuously communicating with said operating chamber, said selector valve assembly being mounted upon said tubular boss, said selector valve assembly passage continuously communicating with said bore.

5. The combination of claim 4 wherein said selector valve has a manually operable valve stem threadedly engaged in and extending through said body on the side of said other valve seat and said fluid supply means.

6. The combination of claim 5 wherein said valve seats are aligned and in opposite ends of said valve chamber, said selector valve being double-ended and having each end complementary to and cooperating with one of said valve seats, said supply conduit communicating with said valve chamber intermediate said valve seats, said selector valve being of less diameter than that of said valve chamber and providing an annular passage about said valve for free flow of fluid therepast in either direction.

7. The combination of claim 1 wherein each said actuating chamber has a bleed means opening into said actuating chamber between said stop means sleeve and the surrounding wall of said actuating chamber.

8. The combination of claim 1 including a tubular boss projecting laterally from said actuator cylinder and having a bore continuously communicating with said operating chamber, said selector valve assembly being mounted upon said tubular boss, said selector valve assembly passage continuously communicating with said bore, said actuator cylinder including a radially inwardly projecting annular rib having a central opening included in said operating chamber and said tubular boss bore communicating through said rib with said central opening, said rib comprising stops limiting inward movement of said actuator piston.

References Cited by the Examiner
UNITED STATES PATENTS

| 737,273 | 8/03 | Reynolds | 137—625.5 |
| 1,968,702 | 7/34 | Nall | 303—84 |
| 1,986,763 | 1/35 | Rhodes | 60—54.5 |
| 2,111,930 | 3/38 | Hinckley | 303—84 |
| 2,246,621 | 6/41 | Davis | 303—84 |
| 2,451,828 | 10/48 | Herriott | 303—84 |
| 2,860,486 | 11/58 | Berg et al. | 60—54.5 |

JULIUS E. WEST, *Primary Examiner.*

ROBERT R. BUNEVICH, *Examiner.*